(12) United States Patent
Gupta et al.

(10) Patent No.: US 7,711,717 B2
(45) Date of Patent: May 4, 2010

(54) ACHIEVING RECURRING ITEM RECORDINGS FROM CALENDARING APPLICATIONS OVER LOB SYSTEMS

(75) Inventors: Rakesh Gupta, Hyderabad (IN); David Koronthaly, Sammamish, WA (US); Burra Gopal, Redmond, WA (US); Rolando Jimenez Salgado, Redmond, WA (US); Shyam Sundar Jayshankar, Hyderabad (IN); Satish Kumar Chittamuru, Hyderabad (IN); Himesh Shah, Redmond, WA (US); Arvind Kumar Krishnan, Hyderabad (IN); Sushil Kumar, Hyderabad (IN); Sai Shankar, Hyderabad (IN); Ashish Kumar Singhal, Hyderabad (IN); Jagdish Singh, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 11/688,312

(22) Filed: Mar. 20, 2007

(65) Prior Publication Data
US 2008/0235072 A1 Sep. 25, 2008

(51) Int. Cl.
*G06F 17/44* (2006.01)
(52) U.S. Cl. .................. 707/695; 707/694; 707/638
(58) Field of Classification Search .............. None
See application file for complete search history.

(56) References Cited

U.S. PATENT DOCUMENTS

| | | | | |
|---|---|---|---|---|
| 6,052,735 | A * | 4/2000 | Ulrich et al. | 709/236 |
| 6,101,480 | A * | 8/2000 | Conmy et al. | 705/9 |
| 6,370,566 | B2 * | 4/2002 | Discolo et al. | 709/206 |
| 6,633,924 | B1 * | 10/2003 | Wu et al. | 719/328 |
| 6,757,696 | B2 * | 6/2004 | Multer et al. | 707/201 |
| 6,892,196 | B1 * | 5/2005 | Hughes | 707/4 |
| 6,944,651 | B2 * | 9/2005 | Onyon et al. | 709/217 |
| 7,016,909 | B2 | 3/2006 | Chan et al. | |
| 7,051,036 | B2 * | 5/2006 | Rosnow et al. | 707/102 |
| 7,082,402 | B2 | 7/2006 | Conmy et al. | |
| 7,334,000 | B2 | 2/2008 | Chhatrapati et al. | |
| 2005/0060638 | A1 * | 3/2005 | Mathew et al. | 715/500 |
| 2005/0091184 | A1 * | 4/2005 | Seshadri et al. | 707/1 |
| 2005/0223047 | A1 * | 10/2005 | Shah et al. | 707/201 |

(Continued)

OTHER PUBLICATIONS

Amicus Attorney 7 Outlook Contacts & Calendar Synchronization, Mar. 26, 2007, Gavel and Gown Software, Inc.*

(Continued)

*Primary Examiner*—Mohammad Ali
*Assistant Examiner*—Sheryl Holland
(74) *Attorney, Agent, or Firm*—Merchant & Gould P.C.

(57) ABSTRACT

Recurring appointment items in a calendaring application are synchronized and recorded in a backend Line Of Business (LOB) service. Items marked in the calendaring application for time recording are used to create a recurring bound item with extended properties. A sweeper module scans on every run the mailbox for such recurring bound items. Occurrences of bound recurring appointments, which occur between the last scan and the current scan, are determined and detached from the corresponding recurring series, such that standalone bound items, are created for such occurrences that can be recognized by an LOB application. Entries for bound items are retrieved from a client data store and synchronized it with the backend LOB service through a create, update, or delete operation request.

16 Claims, 7 Drawing Sheets

U.S. PATENT DOCUMENTS

2006/0224988 A1* 10/2006 Bedingfield, Sr. ............ 715/774
2007/0208803 A1 9/2007 Levi et al.
2008/0281972 A1 11/2008 Gupta et al.

OTHER PUBLICATIONS

Amicus Attorney 7 Link Guide: Palm, Nov. 2006, Gavel and Gown Software, Inc.*

Amicus News, May 2006, Gavel and Gown Software, Inc., vol. 4, Issue 1, p. 1.*

Conferencing Content, http://social.microsoft.com/forums/en-US/ucconferencingdatacollaboration/thread/0f9343cf-2e9b-43c0-acee-f0b18dcb6b3e/, 3 pages (Jun. 5, 2007).

Google Data APIs, http://code.google.com/apis/gdata/elements.html#gdRecurrence, 40 pages (Copyright 2009).

PAWS Calendar Synchronization, http://paws.usask.ca/faq/pda/paws_cal_sync.pdf,, 7 pages (Publicly known at least as early as Jan. 22, 2009).

Re: Webdav: Retrieving all instances of an appointment recurring record, http://www.tech-archive.net/Archive/Exchange/microsoft.public.exchange2000.development/2005-11/msg00038.html, 1 page (Nov. 21, 2005).

Recurring Appointments in MS Outlook's Calendar, http://www.experts-exchange.com/Microsoft/Applications/Q_24055397.html, 2 pages (Jan. 15, 2009).

Sun Java System Calendar Server 6 2005Q4 Developer's Guide, file://C:\Documents and Settings\rharish\Desktop\319228.01—RP—Jan 24,2009-RH\Sun Ja..., 4 pages (Publicly known at least as early as Jan. 22, 2009).

Sun™ One Synchronization 1.1 Patch 2 Release Notes, http://calendar.marymount.edu/en/pda.htm, 17 pages (Nov. 21, 2003).

* cited by examiner

ACHIEVING RECURRING ITEM RECORDINGS FROM CALENDARING APPLICATIONS OVER LOB SYSTEMS

BACKGROUND

Applications that enable organizations to connect their desktop programs, such as calendaring applications, to line-of-business systems in an intuitive, cost-effective way may increase worker efficiency as well as employee satisfaction. By providing information workers with the information they need to make sound, timely business decisions, workers may become more productive and organizations more agile.

Calendaring applications commonly provide support for recurring appointments. However, many calendaring applications may not provide support for time recording. Additionally, many Line Of Business (LOB) servers may not have inherent support for recurring time recording. This results in a less than satisfactory solution for enterprise system users of integrated calendaring and LOB services who have to record their activities for accounting, scheduling, and similar purposes.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to a seamless simulation of recurring time recording in LOB services within a calendaring application user experience. Updates and/or deletions to individual occurrences of a recurring appointment in the calendaring application are automatically synchronized with a backend LOB server, according to some embodiments.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, recurring time recording in LOB services may be seamlessly simulated within a calendaring application user experience. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
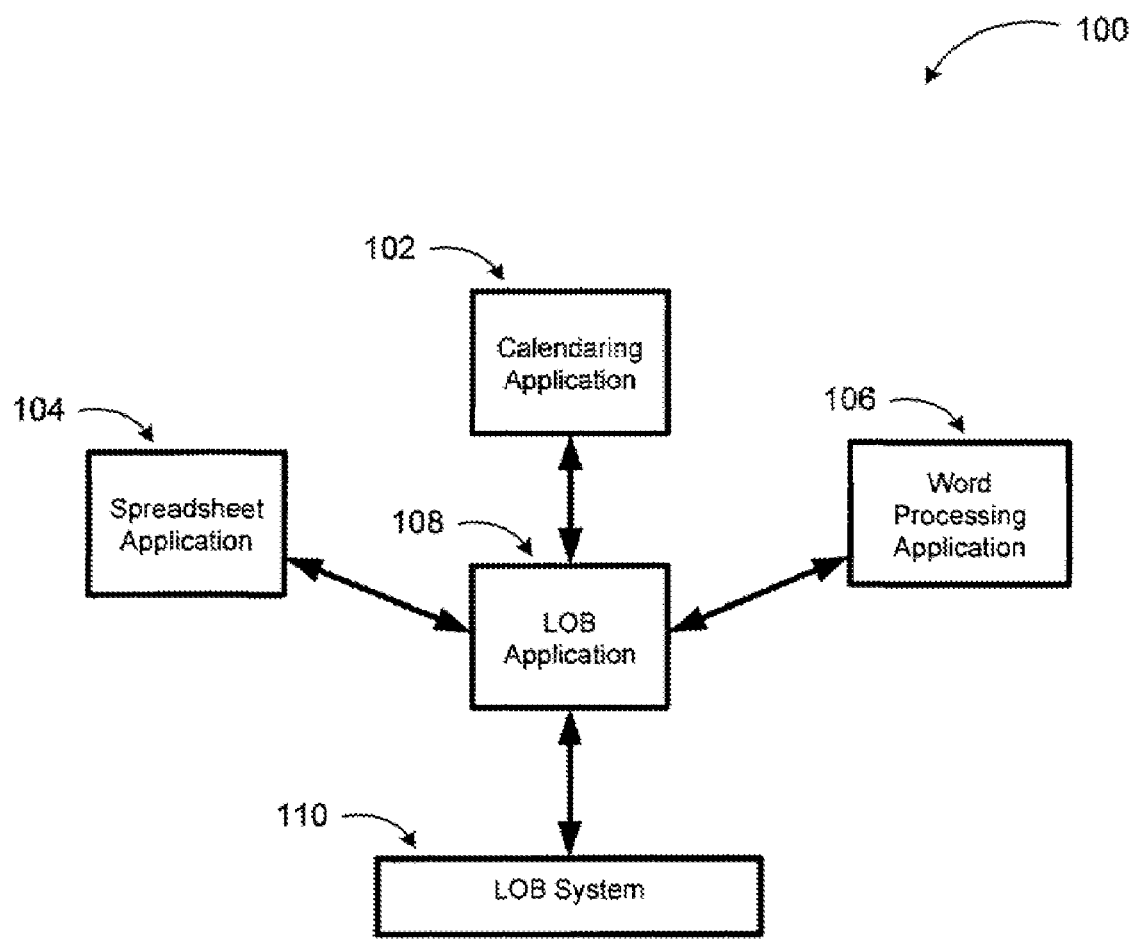
FIG. 1 illustrates an example architecture of a Line Of Business (LOB) service interacting with various desktop applications.

Referring to FIG. 1, example architecture 100 of a Line Of Business (LOB) service interacting with various desktop applications is illustrated. The LOB service may comprise one or more LOB applications supported by a backend LOB system (physical and virtual components such as LOB databases, interfaces, and the like). An LOB application is one of the set of critical computer applications that are vital to running an enterprise, such as accounting, supply chain management, and resource planning applications. LOB applications are usually large programs that contain a number of integrated capabilities and tie into databases and database management systems. Increasingly, LOB applications are being connected with network applications with user interfaces on the web and with personal applications such as e-mail and address books.

Users of common desktop applications such as calendaring application 102, spreadsheet application 104, and work processing application 106 in an enterprise system may interact with a backend LOB system 110 through one or more LOB applications (e.g. LOB application 108) providing input to the LOB system 110, retrieving data, analysis, reports, and the like.

LOB application 108 may not always have inherent interfacing features with the peripheral applications. For example, LOB application 108 may be capable of receiving and recording a time entry from a calendaring or spreadsheet application, but may not be capable of processing recurring appointments or tasks in the calendaring application, necessitating manual entry of such items in the time tracking portion of the LOB application 108.

According to an example scenario, a consultant with a company is working on a project which requires him to spend 3 hours on the project every Monday. On certain Mondays the meeting does not happen and on some Mondays it gets stretched to more than 3 hours. In order to bill the client, the consultant needs to use an LOB application every time and record the billings there. The consultant also maintains this time as a recurring meeting in his calendaring application.

According to some embodiments, the consultant simply creates a recurring "Bound" appointment in his calendaring application and the system automatically records the data for him on the LOB service every Monday. A "Bound" appointment is an appointment in a calendaring application with extended business application related properties. In the event that on some Monday the meeting does not happen, the consultant may just update his recurring appointment item in the calendaring application and the system automatically updates the LOB records.

Figure 2:
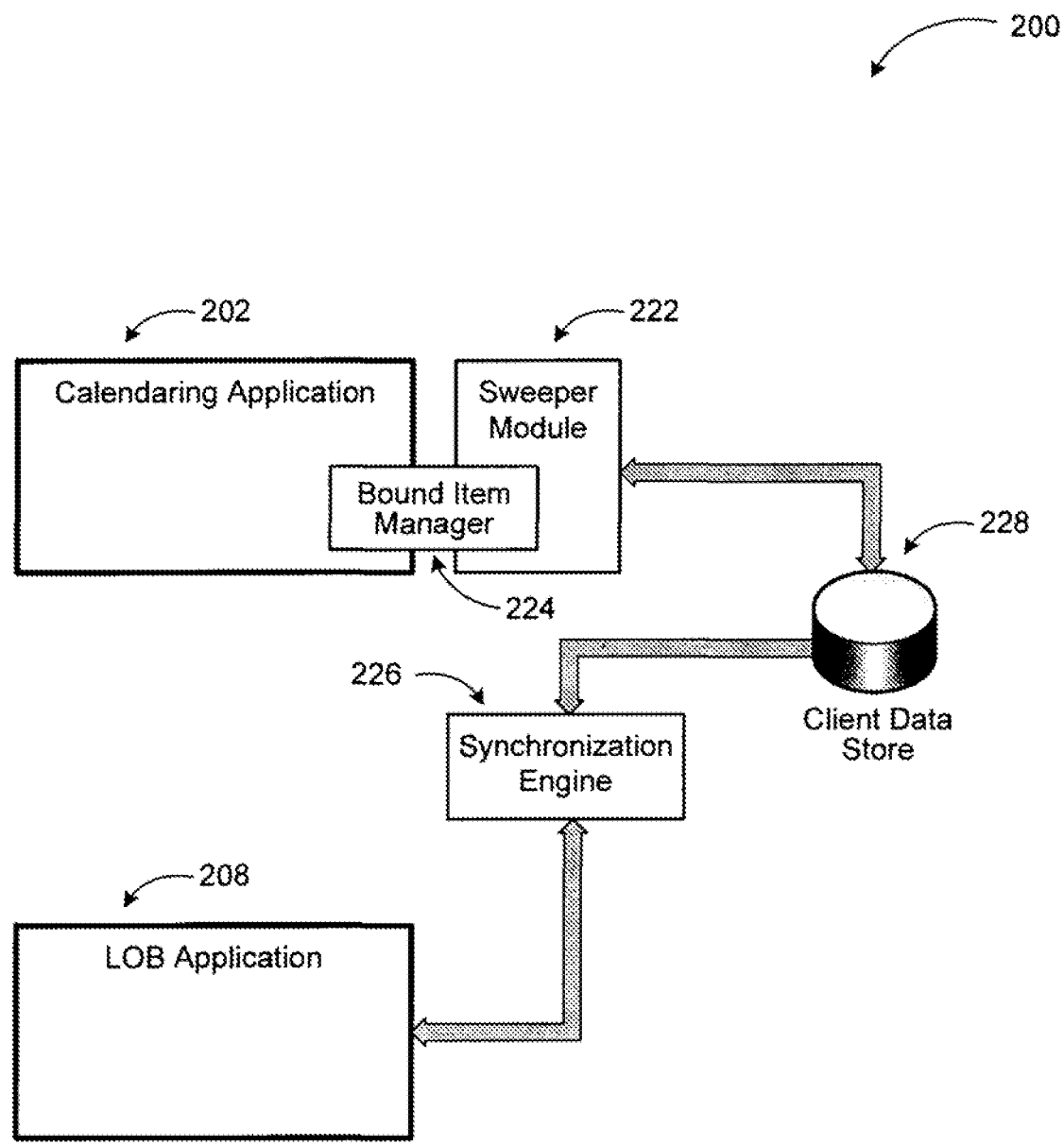
FIG. 2 illustrates example components of a system for seamlessly simulating recurring time recording in an LOB system using a calendaring application.

FIG. 2 illustrates example components of system 200 for seamlessly simulating recurring time recording in an LOB system using a calendaring application. While specific names are used to define the example components, a system according to embodiments is not limited to the definitions and components described below. Seamless simulation of recurring time recording in an LOB system using a calendaring application may be provided using additional or fewer components with each component performing additional or fewer tasks.

Following terms are used herein to describe operations according to embodiments. A "bound item", as mention briefly above, is a calendaring application item with extended business application related properties. An example of a bound item is an appointment item with extended properties like project code, client identifier, etc., which are managed by the business application and are related to a business process or business data on the LOB system. A "bound item manager" is an interface, which provides access to a bound item for create-, update-, or delete-operations. A "sweeper" is a module, which runs at a preconfigured time to scan a user's mailbox and record any changes to the bound items. A "client data store" is any data storage such as an SQL database, which contains information about all bound items in the user's mailbox. The client data store may be used to synchronize the data with the LOB system. A "synchronization engine" is a module, which takes the data from the client data store and sends create-, update-, or delete-requests to the backend LOB system in order to keep the mailbox and the backend LOB system synchronized with regards to bound items.

In an example operation, a user creates a recurring appointment item in calendaring application 202 and marks it for time recording. Internally, the bound item manager interface 224 is used to create a recurring bound item (a recurring appointment item with extended properties). An entry for such a recurring item is also created in the client data store 228.

Sweeper module 222 scans on every run the mailbox for such recurring bound items. Sweeper module 222 determines the occurrences of bound recurring appointments which occur between the last scan by the sweeper module 222 and the current scan. The module then detaches such occurrences from the corresponding recurring series, and creates standalone bound items for such occurrences. The standalone bound occurrences are created mainly because the LOB application 208 can typically synchronize individual appointments, not recurring series appointments.

Sweeper module 222 may also detect any exceptions of the recurring appointment between the scan periods and create individual bound items for those too. Exceptions are individual occurrences that do not strictly follow the recurring series, for example, a weekly Monday 10 am meeting may have an exception to occur on a Tuesday of a certain week, at 11 am instead of 10 am, in a different location, with a different set of attendees, etc.

For creating such individual bound items the sweeper module 222 may use the data present in the entry corresponding to the recurring meeting in the client data store 228. An entry for such bound item occurrences is then created in the client data store 228 to be synchronized with the backend LOB system.

The synchronization engine 226 retrieves the entry from the client data store 228 and synchronizes it with the backend LOB system (through LOB application 208) by making a create-, update-, or delete-operation request. Such a request may be made through a known network protocol (e.g. a web-request). In case of any updates to the occurrences of the appointments become exceptions and the system treats them accordingly. Various kinds of recurrences supported by the calendaring application (weekly, monthly, daily etc) may be supported by the synchronization engine 226.

During a sweeper module scan, if an occurrence has passed, it appears as an independent bound appointment item, which could be treated as a regular appointment item. Independent appointments are created, because those appointments may be automatically tracked by the LOB system, and it would be undesirable to delete past, tracked occurrences when the series they belong to is modified or deleted. Some calendaring applications have a feature where all past occurrences and exceptions are always cleaned up when the series is modified. While this may work for a personal calendar where people do not usually track past appointments, this feature does not work well with bound appointments in an enterprise system since they might carry additional information like billing, time-recordings, etc. Such information may have already been recorded in the LOB system, and financial transactions that may have happened as a result cannot be undone.

If individual appointments are created for past occurrences, but the user does not modify the recurring series, calendaring application 202 may show the slots in the past as double booked, and users may be confused about which appointments are actually being tracked (the ones created as a part of the expanded series, or the ones created explicitly by the tracking system). To avoid this confusion, "delete" exceptions may be created explicitly for the past occurrences of created individual appointments, according to some embodiments. This way the user experience of dealing with recurring bound items is kept similar to the user experience of dealing with regular recurring items in a calendaring application.

Figure 3:
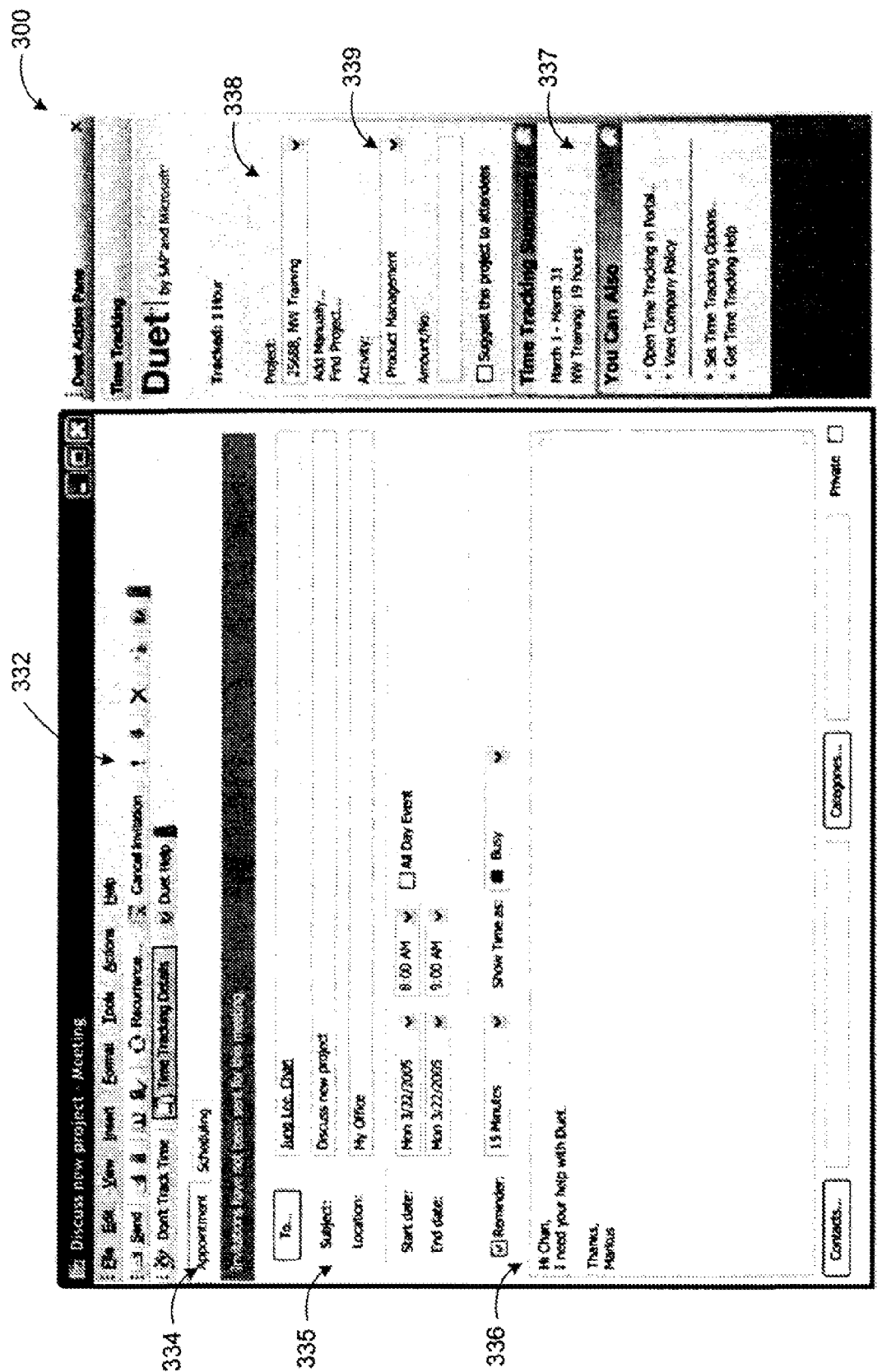
FIG. 3 illustrates a screenshot of an example calendaring application user interface associated with an LOB service for time tracking.

FIG. 3 illustrates a screenshot of an example calendaring application user interface associated with an LOB service for time tracking. The example calendaring application depicted in the screenshot is OUTLOOK® by MICROSOFT CORPORATION of Redmond, Wash., but the features described herein according to embodiments may be implemented in any calendaring application in conjunction with a LOB service.

The user interface 300 of the calendaring application shown in the screenshot includes common controls such as menu items and action icons 332 for creating, deleting appointments, copying, sending a message, and the like. The user interface may include multiple tab views such as "Appointment" view 334 or "Scheduling" view (not shown).

If an appointment involves multiple people, it may be treated similar to an email message by the calendaring application with user interface sections for recipient address, subject, location, time, and the like. The user interface may also include a reminder option, a categorization option (e.g. show the time as busy, available, etc.). The user interface may further include a message box for comments to the recipient.

If the appointment that is being created or modified is one to be tracked by the time recording section of the backend LOB system, an action pane 338 may be provided for the additional features and options associated with time tracking. The additional features and options associated with time tracking may also be provided in form of a tab view, a separate window, or other forms of presentation.

Action pane 338 may include a number of user interface items such as a project definition, activity definition 339, time tracking summary 337, and the like. These items may be information tips or user selectable options provided as a drop down menu, a collapsible tree listing, and so on.

Figure 4:
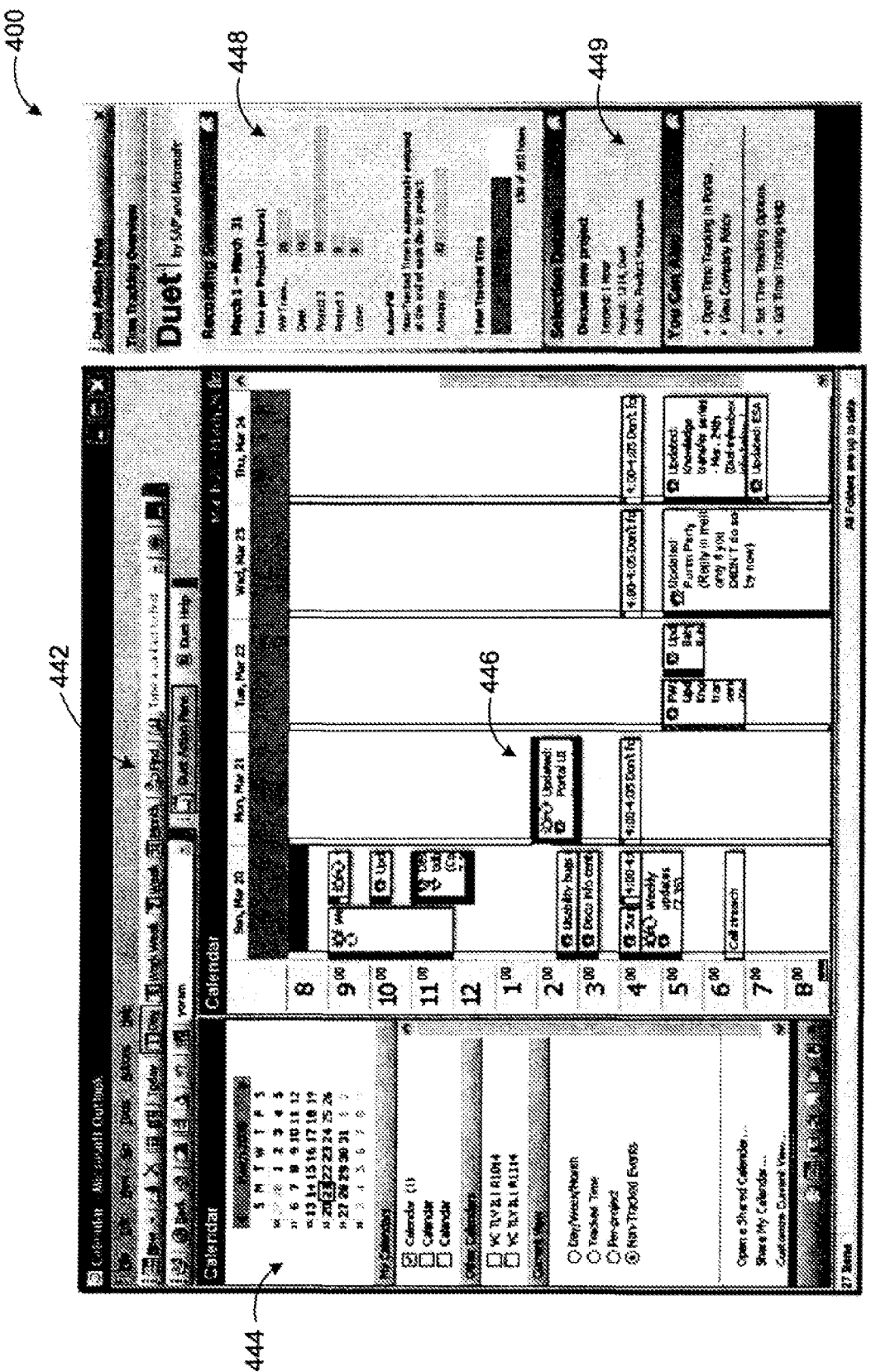
FIG. 4 illustrates another screenshot of an example calendaring application user interface associated with an LOB service for time tracking.

FIG. 4 illustrates another screenshot of an example calendaring application user interface associated with an LOB service for time tracking. Screenshot 400 depicts a calendar view user interface of the calendaring application of FIG. 3.

Calendar view may also include common control menu items and action icons 442 customized for the particular view, a summary calendar 444 of the current or selected month(s), view customization options for the user, and a daily, weekly, or monthly view of the user's appointments (e.g. appointment 446).

Action pane 448 for providing options and actions associated with time tracking may also be customized based on the current view of the calendaring application user interface, as well as user selections. The customization may also be based on user credentials and/or permission levels. For example, a manager may be provided options to view time summaries of employees reporting to him/her, while a non-supervising employee may only get time entry or modification privileges.

Action pane 448 includes time recording summary information for a selected period (e.g. March 1-31) and detail information associated with a selected appointment (e.g. time to be recorded, project, activity, and the like). The action pane may also provide options to the user for to set time tracking preferences, select and update (or delete) past items, and so on. While screenshots 300 and 400 of FIG. 3 and FIG. 4 illustrate time tracking based on appointments in a calendaring application, embodiments are not limited to appointments. Other calendaring application items such as tasks may also be used to perform create-, update-, or delete-operations in the backend LOB system from the calendaring application.

Figure 5:
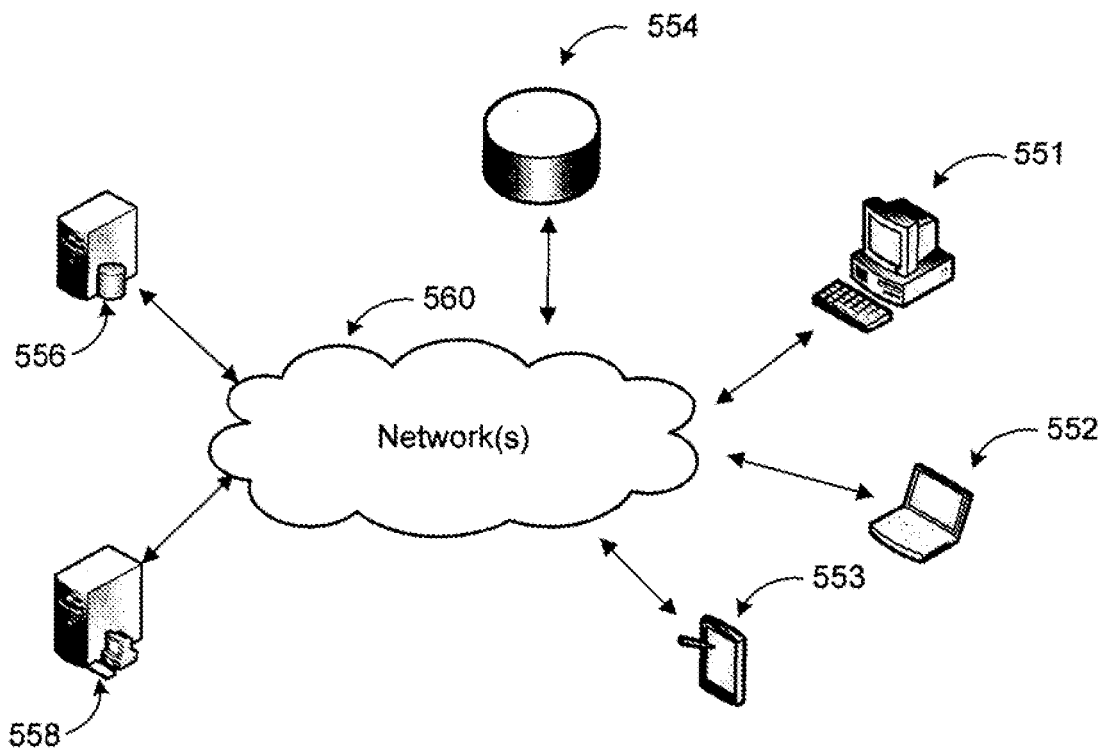
FIG. 5 is an example networked environment, where embodiments may be implemented.

FIG. 5 is an example networked environment, where embodiments may be implemented. Calendaring applications and LOB systems may be implemented locally on a single computing device or in a distributed manner over a number of physical and virtual clients and servers. They may also be implemented in un-clustered systems or clustered systems employing a number of nodes communicating over one or more networks (e.g. network(s) 560).

Such a system may comprise any topology of servers, clients, Internet service providers, and communication media. Also, the system may have a static or dynamic topology. The term "client" may refer to a client application or a client device. While a networked system implementing seamless simulation of recurring time recording in LOB services within a calendar application user experience may involve many more components, relevant ones are discussed in conjunction with this figure.

A calendaring application according to embodiments may be implemented in individual client devices 551-553 or executed in server 558 and accessed from any one of the client devices (or applications). Similarly an LOB service associated with the calendaring application may be executed locally in one of the client devices or, more typically, in one or more servers (e.g. server 558) and accessed by the client devices (or applications).

Data stores associated with providing seamless simulation of recurring time recording in LOB services within a calendar application may be embodied in a single data store such as data store 554 or distributed over a number of data stores associated with individual client devices, servers, and the like. Dedicated database servers (e.g. database server 556) may be used to coordinate data retrieval and storage in one or more of such data stores.

Network(s) 270 may include a secure network such as an enterprise network, an unsecure network such as a wireless open network, or the Internet. Network(s) 270 provide communication between the nodes described herein. By way of example, and not limitation, network(s) 270 may include wired media such as a wired network or direct-wired connection, and wireless media such as acoustic, RF, infrared and other wireless media.

Many other configurations of computing devices, applications, data sources, data distribution systems may be employed to implement providing seamless simulation of recurring time recording in LOB services within a calendar application user experience. Furthermore, the networked environments discussed in FIG. 5 are for illustration purposes only. Embodiments are not limited to the example applications, modules, or processes.

Figure 6:
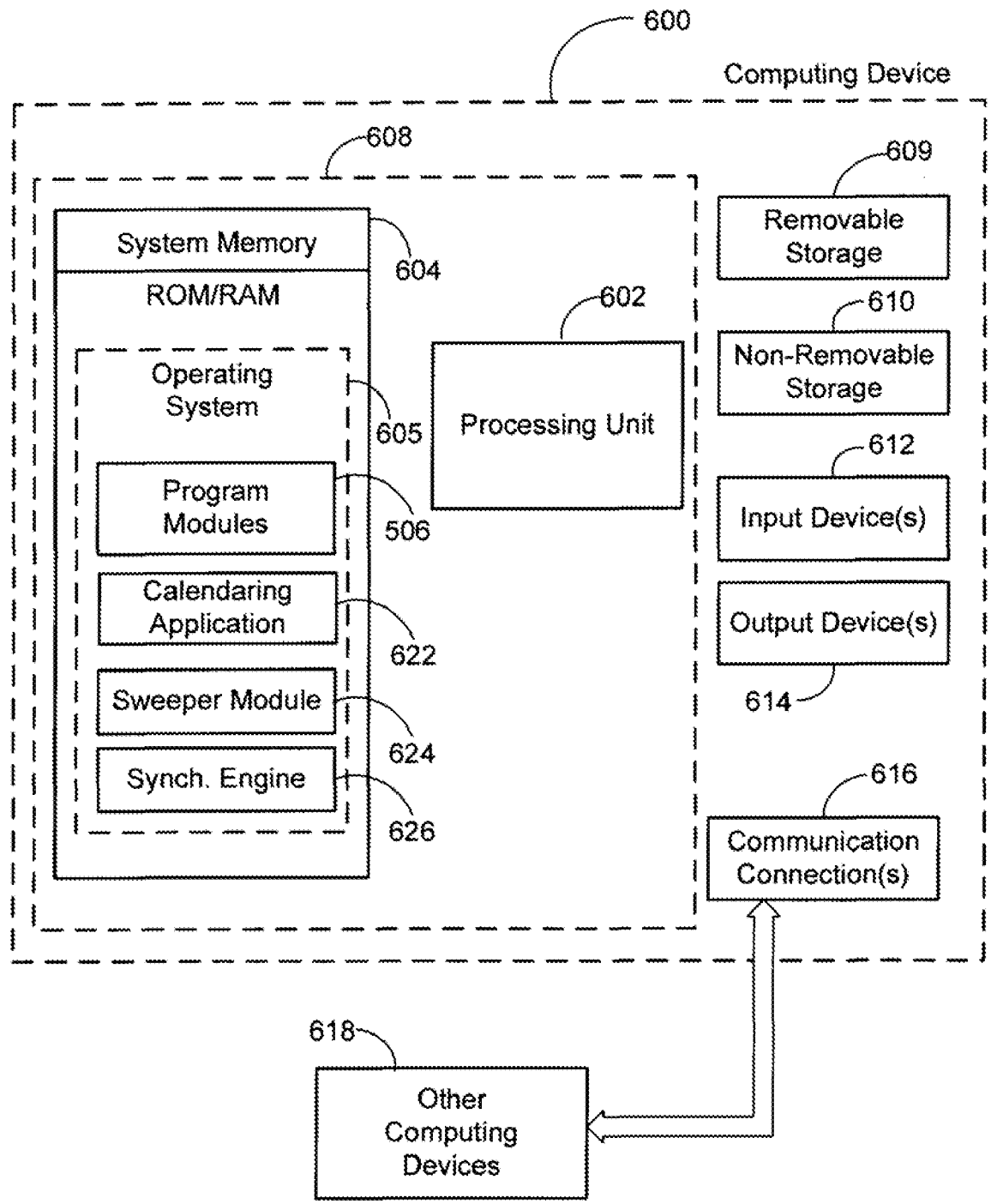
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment is illustrated, such as computing device 600. In a basic configuration, the computing device 600 may be a client device providing calendaring application(s) in conjunction with an LOB service and typically include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of a networked personal computer, such as the WINDOWS® operating systems from MICROSOFT CORPORATION of Redmond, Wash. The system memory 604 may also include one or more software applications such as program modules 606, calendaring application 622, sweeper module 624, and synchronization engine 626.

Calendaring application 622 may be a separate application or an integral module of a desktop service that provides calendaring, scheduling, messaging, and similar services to applications associated with computing device 600. Sweeper module 624 and synchronization engine 626 may provide services associated with determining calendaring items (e.g. appointments, tasks, etc.) in the calendaring application 622 and ensuring recording of time in the LOB service associated with those items as described previously. This basic configuration is illustrated in FIG. 6 by those components within dashed line 608.

The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer storage media may include volatile and non-volatile, removable and non-removable media implemented in any method or technology for storage of information, such as computer readable instructions, data structures, program modules, or other data. System memory 604, removable storage 609 and non-removable storage 610 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of device 600. Computing device 600 may also have input device(s) 612 such as keyboard, mouse, pen, voice input device, touch input device, etc. Output device(s) 614 such as a display, speakers, printer, etc. may also be included. These devices are well known in the art and need not be discussed at length here.

The computing device 600 may also contain communication connections 616 that allow the device to communicate with other computing devices 618, such as over a wireless network in a distributed computing environment, for example, an intranet or the Internet. Other computing devices 618 may include server(s) that execute applications associated with the backend LOB service. Communication connection 616 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
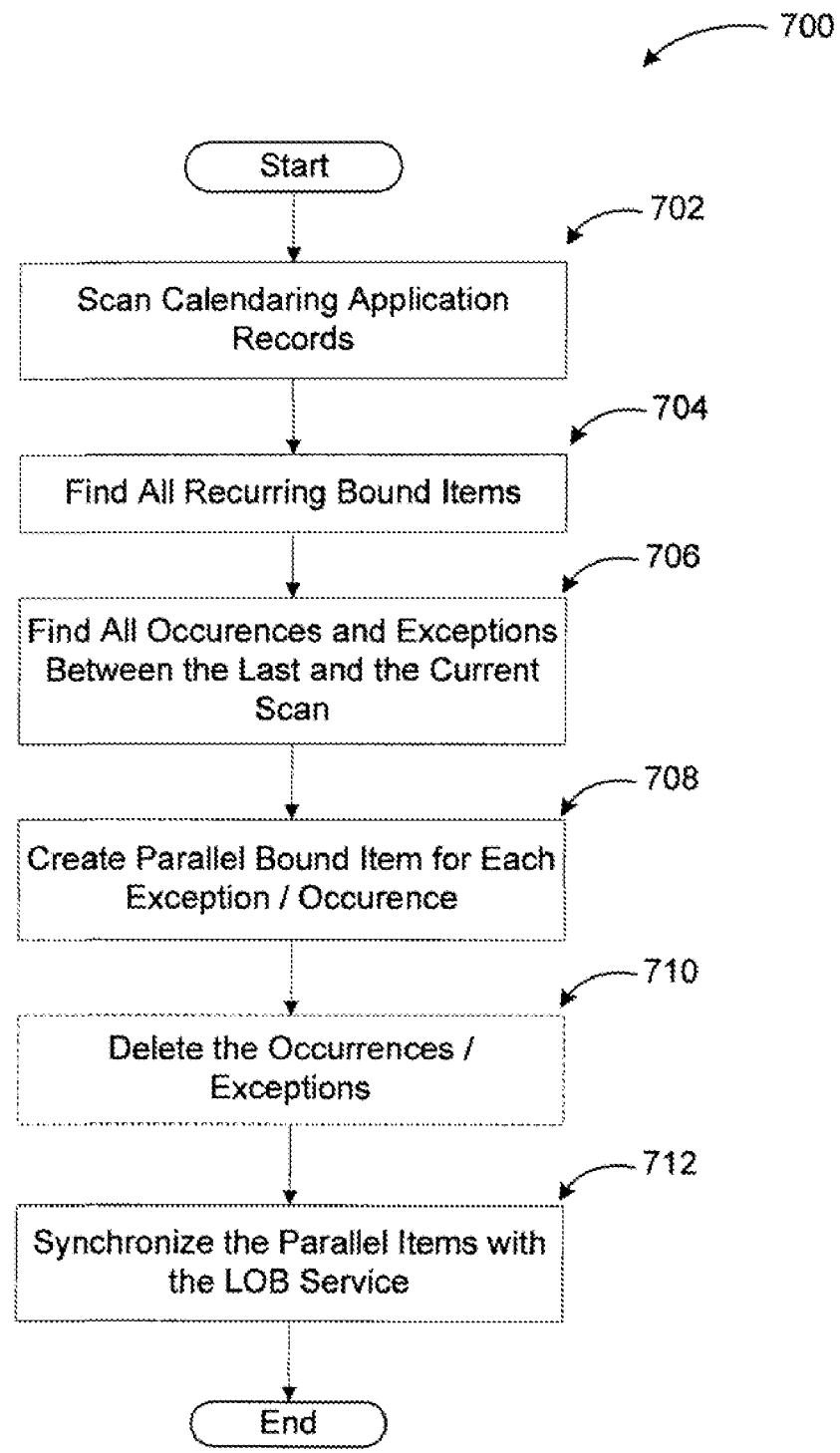
FIG. 7 illustrates a logic flow diagram for a process of simulating recurring time recording in an LOB system using a calendaring application.

FIG. 7 illustrates a logic flow diagram for a process of simulating recurring time recording in an LOB system using a calendaring application. Process 700 may be implemented as part of a calendaring application in conjunction with a backend LOB system.

Process 700 begins with operation 702, where a scan of calendaring application items such as appointments and tasks is performed to determine items associated with time recording (tracking) on the backend LOB system. Processing advances from operation 702 to operation 704.

At operation 704, recurring bound items are found (created) as described previously. Processing continues to operation 706 from operation 704.

At operation 706, all occurrences and exceptions between the last scan and the current scan are determined for synchronization with the LOB service. Processing moves to operation 708 from operation 706.

At operation 708, parallel bound items for each of the occurrences or exceptions are created. The parallel bound items may be stored in the client data store. Processing advances to optional operation 710 from operation 708.

At operation 710, original bound items for occurrences and exceptions are deleted to prevent user confusion as to which item is recorded with the LOB system. Processing moves to operation 712 from optional operation 710.

At operation 712, the parallel items are synchronized with the LOB service (through an LOB application). After operation 712, processing moves to a calling process for further actions.

The operations included in process 700 are for illustration purposes. Providing a seamless simulation of recurring items of a calendaring application in a backend LOB system may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for providing synchronization between a calendaring application and a Line Of Business (LOB) service, the method comprising:

scanning records of the calendaring application;

determining recurring bound items in the calendaring application records for the synchronization;

creating an original bound item for each recurring item occurrence and each recurring item exception, wherein the original bound item comprises at least one of an appointment, a meeting, and a task in the calendaring application, the at least one of an appointment, a meeting, and a task having extended properties which are managed by the calendaring application and are related to at least one of a business process and business data associated with the LOB service, the extended properties comprising at least one of project code and a client identifier;

creating a parallel bound item for each original bound item in a client data store;

deleting the original bound item after a corresponding parallel bound item is created; and synchronizing the bound items with the LOB service, wherein each bound item is presented to the LOB service as a standalone bound item, wherein the standalone bound item comprises a bound item which is detached from the recurring bound items in the calendaring application records for synchronization as an individual appointment.

2. The method of claim 1, wherein the synchronization operation includes at least one from a set of: a delete operation, a create operation, and an update operation.

3. The method of claim 1, wherein the calendaring application records are scanned based on at least one from a set of: expiration of a predefined period, a user request, and an LOB service request.

4. The method of claim 1, wherein the synchronization is performed employing a web-request.

5. A system for providing synchronization between a calendaring application and a Line Of Business (LOB) service, the system comprising:
- a memory;
- a processor coupled to the memory, wherein the processor is configured to execute program modules including:
- an application to provide a user interface and maintain records associated with calendar items of a user, wherein a portion of the calendar items are bound items with extended LOB properties, wherein the extended LOB properties are managed by the calendaring application and are related to at least one of a business process and business data associated with the LOB service, the extended LOB properties comprising at least one of project code and a client identifier;
- an interface module to enable operations on the bound items, the operations comprising creating parallel bound items for the bound items and deleting the bound items after the creation of corresponding parallel bound items;
- a sweeper module to scan and record changes to the bound items as the parallel bound items; and
- a client data store for storing at least the parallel bound items;
- a synchronization engine to retrieve the parallel bound items and synchronize the parallel bound items with a database associated with the LOB service.

6. The system of claim 5, wherein the interface module is further configured to enable one of the user and an administrator to provide at least one preference for synchronizing the bound items with the LOB service based on a credential and a permission level assigned to the user and the administrator.

7. The system of claim 6, wherein one of the user and the administrator is enabled to provide the at least one preference based on a bound item type.

8. The system of claim 5, wherein the sweeper module is configured to scan changes to the bound items based on at least one from a set of: expiration of a predefined period, a user request, and an LOB service request.

9. The system of claim 5, wherein the synchronization engine is configured to synchronize the parallel bound items with the LOB database based on at least one from a set of: expiration of a predefined period, a user request, and an LOB service request.

10. The system of claim 5, wherein the processor is further configured to provide a user interface for operations associated with the interface module, the sweeper module, and the synchronization engine as one of: an action pane, a view tab, and a separate window in conjunction with a user interface of the application.

11. The system of claim 5, wherein the interface module and the sweeper module are arranged to perform operations independent of a connection status between the application and the LOB service, and wherein the synchronization engine is arranged to synchronize the parallel items created during an offline period upon reconnection to the LOB service.

12. The system of claim 5, wherein the client data store is one of a SQL database, a multi-dimensional data store, and a spreadsheet.

13. The system of claim 5, wherein the application is a module of a desktop application arranged to provide scheduling, calendaring, and messaging services.

14. A computer-readable storage medium with instructions stored thereon for providing synchronization between a calendaring application and a Line Of Business (LOB) service, the instructions comprising:
- providing access to calendaring application records associated with calendar items of a user, wherein a portion of the calendar items are bound items with extended LOB properties, wherein the extended LOB properties are managed by the calendaring application and are related to at least one of a business process and business data associated with the LOB service, the extended LOB properties comprising at least one of project code and a client identifier;
- determining changes to the bound items;
- recording the determined changes as parallel items in a client data store;
- deleting the bound items upon recording the changes as parallel items;
- retrieving the parallel items from the client data store; and
- synchronizing a database associated with the LOB service during an online period based on the retrieved parallel items.

15. The computer-readable storage medium of claim 14, wherein the bound items include at least one of an occurrence of a recurring appointment and an exception to a recurring appointment.

16. The computer-readable storage medium of claim 15, wherein the parallel items are presented to the LOB service as standalone items for synchronization.

* * * * *